(12) United States Patent
Jansson et al.

(10) Patent No.: US 8,990,286 B2
(45) Date of Patent: Mar. 24, 2015

(54) INTEGRATION OF WEB SERVICES WITH A CLUSTERED ACTOR BASED MODEL

(75) Inventors: Andreas Jansson, San Francisco, CA (US); Niklas Modin, Oakland, CA (US)

(73) Assignee: Oracle International Corporation, Redwood Shores, CA (US)

( * ) Notice: Subject to any disclaimer, the term of this patent is extended or adjusted under 35 U.S.C. 154(b) by 130 days.

(21) Appl. No.: 13/445,595

(22) Filed: Apr. 12, 2012

(65) Prior Publication Data
US 2013/0275489 A1  Oct. 17, 2013

(51) Int. Cl.
*G06F 15/16* (2006.01)
*G06F 17/30* (2006.01)

(52) U.S. Cl.
CPC ................................ *G06F 17/3089* (2013.01)
USPC ...................................................... 709/202

(58) Field of Classification Search
CPC .............. H04L 29/08072; H04L 29/06; H04L 29/08135; H04L 29/08648; H04L 29/08981
USPC ................................... 709/202, 205, 206, 207
See application file for complete search history.

(56) References Cited

U.S. PATENT DOCUMENTS

| | | | |
|---|---|---|---|
| 6,760,417 | B1 | 7/2004 | Wallenius |
| 7,089,317 | B2 * | 8/2006 | Jeyaraman et al. ............ 709/230 |
| 7,136,913 | B2 | 11/2006 | Linderman |
| 7,483,438 | B2 | 1/2009 | Serghi et al. |
| 8,296,409 | B2 | 10/2012 | Banerjee et al. |
| 2002/0025795 | A1 | 2/2002 | Sharon et al. |
| 2003/0028790 | A1 | 2/2003 | Bleumer et al. |
| 2003/0070006 | A1 * | 4/2003 | Nadler et al. ................. 709/330 |
| 2004/0009762 | A1 | 1/2004 | Bugiu et al. |
| 2005/0245230 | A1 | 11/2005 | Benco et al. |
| 2006/0136914 | A1 * | 6/2006 | Marascio et al. ............. 718/100 |
| 2006/0179342 | A1 * | 8/2006 | Reed et al. ......................... 714/4 |
| 2006/0262915 | A1 * | 11/2006 | Marascio et al. ........ 379/201.01 |
| 2007/0106801 | A1 | 5/2007 | Jansson |
| 2007/0143470 | A1 | 6/2007 | Sylvain |
| 2007/0150546 | A1 * | 6/2007 | Karakashian et al. ........ 709/207 |
| 2008/0103923 | A1 | 5/2008 | Rieck et al. |
| 2008/0163267 | A1 * | 7/2008 | Jurova et al. .................. 719/328 |
| 2008/0163767 | A1 * | 7/2008 | Wu Chang ..................... 99/492 |
| 2009/0268715 | A1 | 10/2009 | Jansson |
| 2010/0027774 | A1 * | 2/2010 | Capuozzo et al. ....... 379/201.02 |
| 2011/0082920 | A1 | 4/2011 | Bhattacharya et al. |
| 2011/0119150 | A1 * | 5/2011 | Kane et al. .................... 705/26.7 |
| 2013/0066935 | A1 * | 3/2013 | Reed et al. ..................... 709/201 |

OTHER PUBLICATIONS

BEA, WebLogic Network Gatekeeper, Architectural Overview, Version 3.0, 112 pages, Sep. 2007.
Chen et al., Applying SOA and Web 2.0 to Telecom: Legacy and IMS Next-Generation Architectures, IEEE, 6 pages, 2008.
Oracle Communication Services Gatekeeper Concepts and Architectural Overview, Release 4.1, Oracle, 94 pages, Jan. 2009.

\* cited by examiner

*Primary Examiner* — Kevin Bates
*Assistant Examiner* — Ronak Patel
(74) *Attorney, Agent, or Firm* — Meyer IP Law Group

(57) ABSTRACT

In accordance with various embodiments, systems and methods that integrates web services into an actor model are provided. Such a system can include an event broker, which is operable to manage events between one or more actors and a plurality web services. The system can also include a plurality of protocol adapters. Each protocol adapter is associated with a different one of the plurality of web services. The system can further include a web services bundle which is a common library shared by the plurality of protocol adapters. Each protocol adapter can convert web services messages received from a web service into events and publish the events using the event broker.

20 Claims, 6 Drawing Sheets

INTEGRATION OF WEB SERVICES WITH A CLUSTERED ACTOR BASED MODEL

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to a standards based way to build, deploy and manage web services and in particular to the integration of web services with a clustered actor based model.

BACKGROUND

Web services provide a means for computer systems to communicate with one another over a network, such as the Internet, using standards such as HTML and XML. As such, web services can provide a common, standard way to integrate between different systems. However not all systems and programming models can easily support web services. For example, systems based on a clustered application based on an actor model are asynchronous and event driven, while web services are typically synchronous and based on a request/response pattern.

SUMMARY

In accordance with various embodiments, systems and methods that integrates web services into an actor model are provided. Such a system can include an event broker, which is operable to manage events between one or more actors and a plurality web services. The system can also include a plurality of protocol adapters. Each protocol adapter is associated with a different one of the plurality of web services. The system can further include a web services bundle which is a common library shared by the plurality of protocol adapters. Each protocol adapter can convert web services messages received from a web service into events and publish the events using the event broker.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

In accordance with an embodiment of the invention, existing technologies (such as JAX-RS/JSR 311 and JAX-WS) can be integrated with web services and a model can be provided which specifies how synchronous web services can be converted into events that can be asynchronously consumed by actors in an actor model. These events are defined in a protocol agnostic way to make it transparent to the application what type of web service is used.

Additionally, in accordance with an embodiment of the invention, the ability to consume web service requests is extended in a model that does not previously have that support. It also provides a consistent programming model for a developer to transparently consume different web services technologies, such as SOAP and REST.

In accordance with an embodiment of the invention, each web service feature is implemented as a separate protocol adapter, and can be integrated with an HTTP adapter. The web services and client code can be deployed as separate OSGi bundles, and an API is provided by the protocol adapters to allow these bundles to handles communication with the actor model and the event broker.

Although embodiments of the present invention are discussed with respect to some features, such as server and client side HTTP/SOAP and REST support, and also security features like HTTPS, basic authentication and UsernameTokenauthentication, additional features could also be similarly integrated, such as transactions, advanced authentication mechanisms like SAML, and additional transports like JMS.

Module Boundaries

Figure 1:
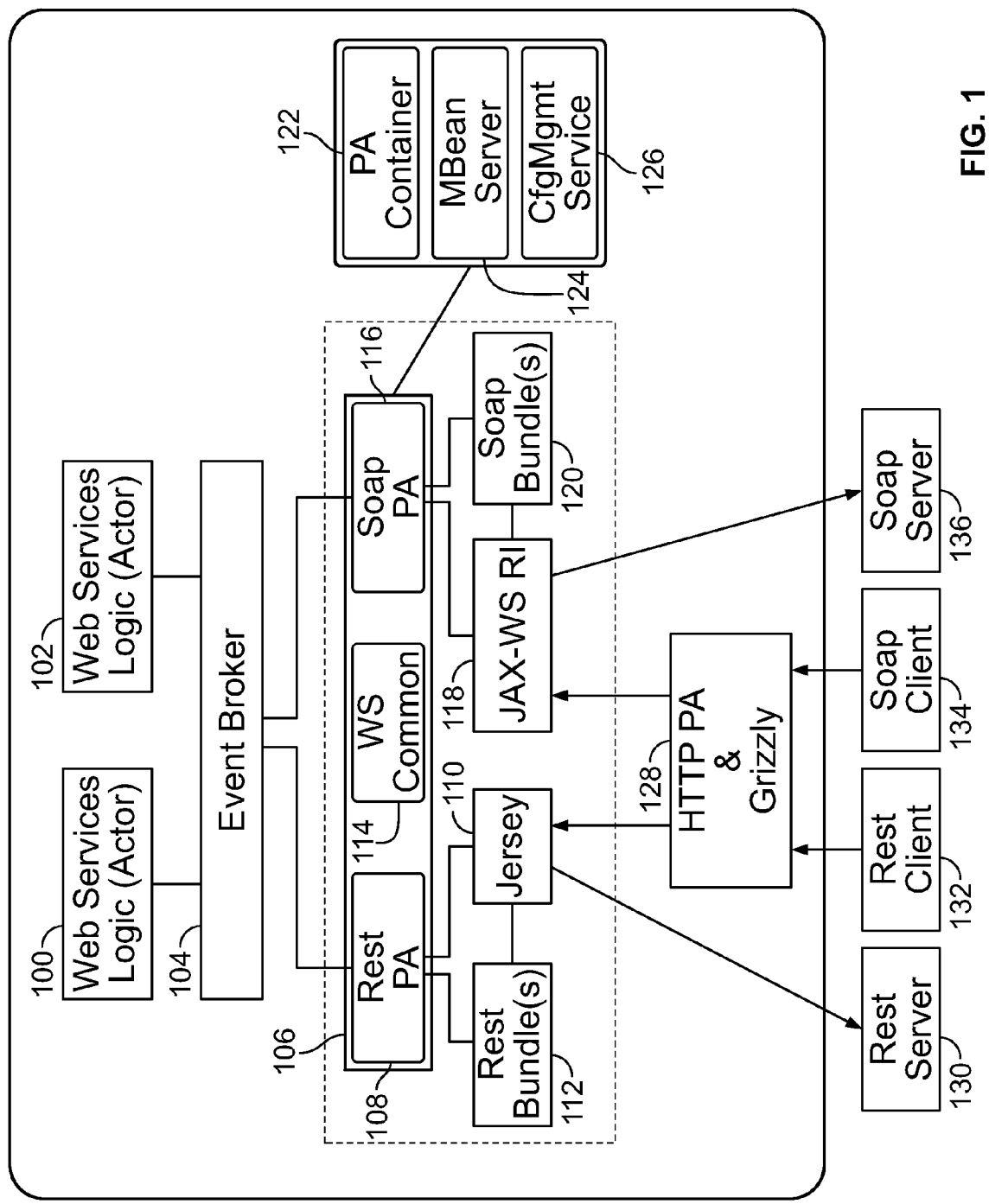
FIG. 1 illustrates boundaries and dependencies for protocol adapters, in accordance with an embodiment of the invention.

FIG. 1 illustrates boundaries and dependencies for protocol adapters, in accordance with an embodiment of the invention. Web Services Logic (actors) 100 and 102 are applications, which are typically actors that interact using SOAP or REST web services. The event broker 104 dispatches web services events between each application and the protocol adapters 106. The REST protocol adapter (PA) 108 provides the REST protocol support by integrating with Jersey 110 and deploying REST enabled bundles 112. The WS Common bundle 114 is a common library shared by the REST and SOAP protocol adapters. It provides event definitions and related event factories. The SOAP PA 116 provides SOAP protocol support by integrating with JAX-WS RI 118 and deploying SOAP enabled bundles 120.

In accordance with an embodiment of the invention, REST bundles 112 are server/client bundles which can be provided to implement specific REST web services and can support the client or server sides. Similarly, SOAP bundles 120 are server/client bundles which can be provided to implement specific SOAP web services and can support the client or server side. The Protocol Adapter Container 122 can manage the lifecycle of each of the PAs. An MBean server 124 can provide runtime management. A CfgMgmt Server 126 can provide configuration services including a credential store. Jersey 110 is the reference implementation for JAX-RS. JAX-WS RI 118 is the reference implementation for JAX-WS. HTTP PA & Grizzly 128 can provide the HTTP server side implementation. One or more external REST servers and clients, as well as one or more external SOAP servers and clients are represented by REST server 130, REST client 132, SOAP client 134, and SOAP server 136.

Application API

In accordance with an embodiment of the invention, applications, as referred to herein, are typically actors, but can refer to anything that is capable of interacting with the event broker. An application can both implement the business logic for a specific web service (i.e. be the server side) or make web service requests to some external web service (i.e., act as a client). An Event API is designed to be generic and hide any specifics about the underlying protocol, such that it provides a seamless way for the application to use web services such as REST or SOAP.

Events that can be of interest to the application include inbound web services requests, outbound web services response, outbound web service request, and inbound web service response. In accordance with an embodiment of the invention, these events can be represented as:

WsInboundReqEvent—This event corresponds to an inbound web services request. It can include the type of web service (e.g., SOAP or REST), the name of the service, and the name of the operation. Additionally, parameters from the request can be provided in the form of name/value pairs.

WsOutboundResEvent—This event corresponds to the response to an inbound web service request event (WsInboundReqEvent). This event can fill in response parameters (also name/value pairs) and it can optionally provide an HTTP status code and message, which can be used, for example, to signal any errors.

WsOutboundReqEvent—This event corresponds to an outbound web services request. This event can be initiated by the application and includes the type of web service (e.g., SOAP or REST), the URL to the service, the name of the service, the name of the operation and request parameters which can be provided in the form of name/value pairs.

WsInboundResEvent—This event corresponds to the response to an outbound web services request event (WsOutbundReqEvent) based on the response from the external web service. It can include the response parameters as name/value pairs, and it can also include an HTTP status code and optional message.

Web Services Bundles

In accordance with an embodiment of the invention, the web services bundles 112, 120 are the components that provide the protocol mapping between the generic web services events and the underlying web services technology (e.g. JAX-RS or JAX-WS). These bundles are extensions that can be developed for each web service API that is supported.

The web services bundles 112, 120 are deployed in the same managed server as the protocol adapters 106. Each web services bundle can implement one or more web services. Each web services bundle also includes a configuration file that describes what services are implemented. The protocol adapter can find bundles with this deployment file and trigger loading of the web services and deployment with the stack.

The web service bundles 112, 120 can interact with several APIs, including the event API, a protocol adapter API and a web services bundle API. The event API, as described above, can be used to map incoming and outgoing requests and responses between the events and web services requests. These events are typically generic, with parameters sent as name/value pairs, thus each implementation can customize how operations and parameters are mapped. Applications can then use the customized mapping to properly utilize a service. The Protocol Adapter API can be used to interact with the protocol adapter. The Protocol Adapter API can be used to create events, and dispatch and receive the events. The web services bundle API corresponds to the web services stack, which for example can be JAX-WS or JAX-RS depending on the type of web service that is being implemented.

Protocol Adapters

In accordance with an embodiment of the invention, each protocol adapter 106 manages the installed web services bundles 112, 120 and the underlying web services stack. At startup of a server the protocol adapters can locate all web services bundles, load the appropriate implementation classes and deploy the web services bundles in the stack. The web services bundles can also provide the API for the web services to interact with the event broker. This API can be injected into the web service implementation at deployment.

Web Services Stacks

Different web services stacks can be used depending on which web services are supported. For example, in accordance with an embodiment of the invention, the web services stacks can include Jersey JAX-RS RI (Jersey) 110, and JAX-WS RI 118. The Jersey JAX-RS RI stack 110 can be used for REST support. JAX-RS defines a server API and not a client API, but Jersey provides a client API for that purpose. The JAX-WS RI stack 118 provides the SOAP support and includes a standard for both server and client side support. Both Jersey and JAX-WS rely on an HTTP container 128 for the server side, for example Grizzly. This means that HTTP traffic enters on the same port and is then dispatched to the correct protocol adapter based on the context path. For the client side, the stacks can default to a standard Java URL connection handler.

Web Service Deployment

Figure 2:
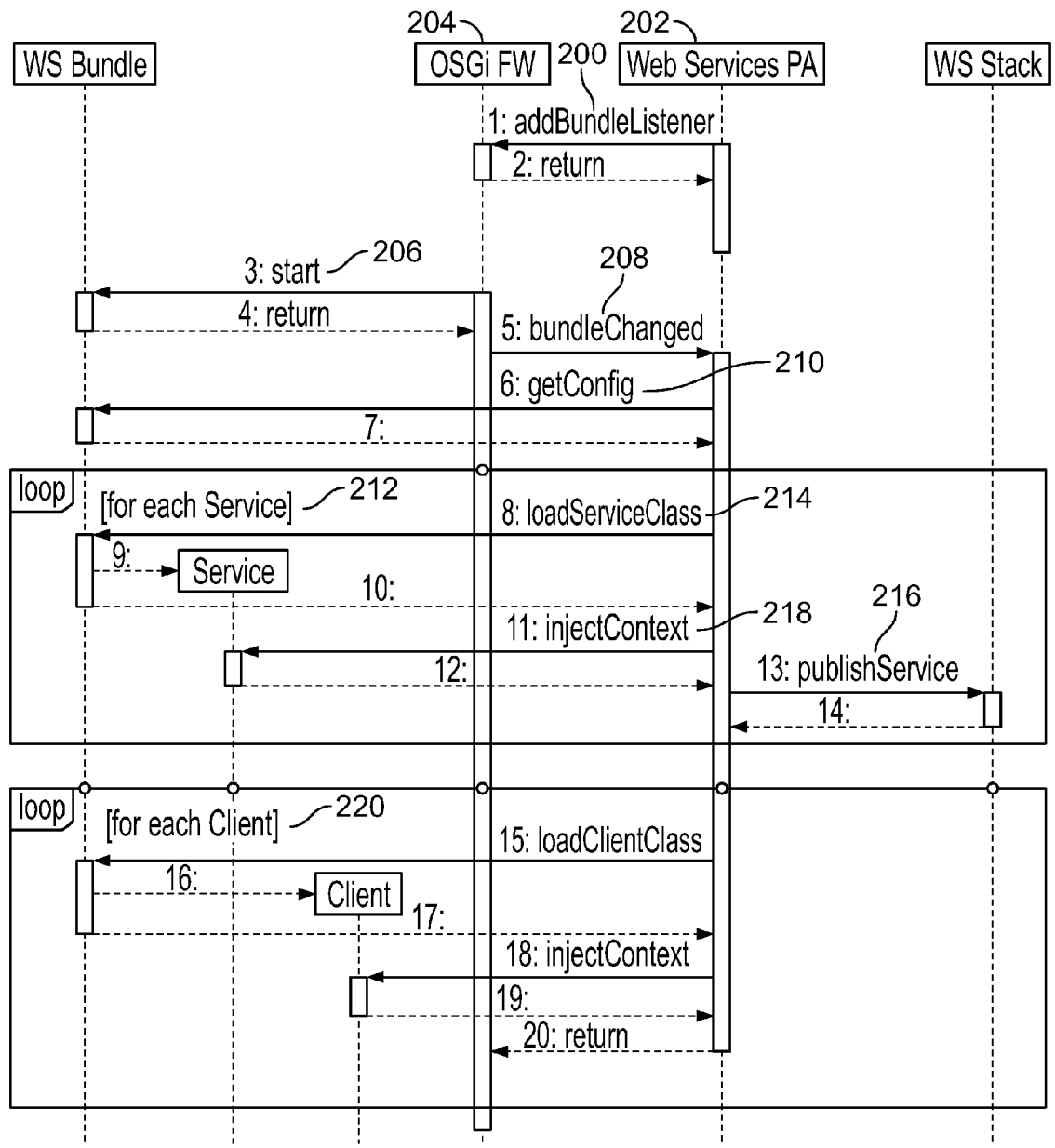
FIG. 2 shows a sequence diagram showing the general publishing of web services implemented in a separate bundle, in accordance with an embodiment of the invention.

FIG. 2 shows a sequence diagram showing the general publishing of web services implemented in a separate bundle, in accordance with an embodiment of the invention. At 200, when a web services protocol adapter (PA) 202 starts, it registers with the OSGi FW 204 to be notified of any bundles starting. At 206, when a bundle is started, the PA is notified 208 and checks 210 if there is any web services configuration information available for that bundle. If there is, processing continues. At 212, each class that is listed as a web service (e.g., SOAP Endpoint or REST Application) is loaded 214 and published 216 with the web services stack (e.g., see 110, 118). At 218 (injectContext), the PA 202 provides to the service a reference to the PA 202, which allows the service to dispatch requests. At 220, each class listed as a web service client is loaded. The class should implement the WsClient interface. When the objects are created, the PA 202 keeps track of each client and what services it supports to be able to dispatch events to the object.

Inbound Web Services Request

Figure 3:
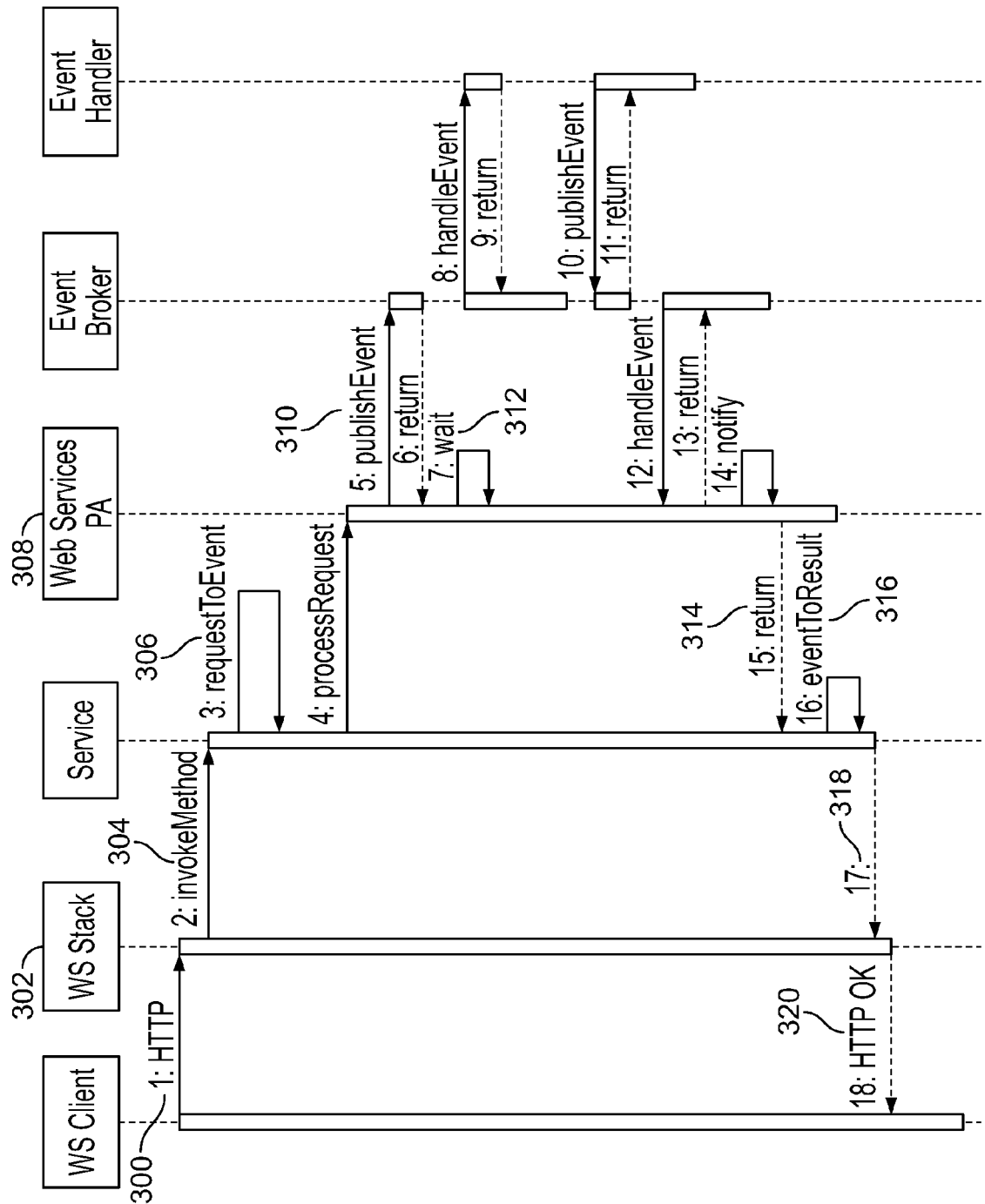
FIG. 3 shows a sequence diagram of asynchronous processing of requests from a web services client, in accordance with an embodiment of the invention.

FIG. 3 shows a sequence diagram of asynchronous processing of requests from a web services client, in accordance with an embodiment of the invention. Once web services have been deployed, as described above with respect to FIG. 2, communication between the actor-based system and web services clients/servers is possible. Web services are typically synchronous, as such these services typically pause (i.e., are blocked) while the request is being processed before being able to return the results. For services that require high performance it is beneficial to use an asynchronous approach.

At 300, an external web services client makes a request using HTTP. First the HTTP request reaches the server side HTTP implementation, e.g., Grizzly 128, which can perform HTTP/HTTPS decoding. Additionally, a filter can be provided to perform basic authentication if applicable. Next, the HTTP implementation, e.g., 128, can dispatch the event to the appropriate HTTP handler based on the context path. If the context path points to a deployed web service then the WS stack 302 is called. At 304, the WS stack decodes the HTTP request (e.g. decoding XML or JSON content, etc) and can invoke the web service Java object implementation. At 306, the service converts the request into a WsInboundReqEvent and dispatches it to the web services protocol adapter (PA) 308. The web services PA can asynchronously publish 310 the event, then wait 312 for a response from the application, and can then return 314 the resulting WsOutboundResEvent. Thus, from the service point of view processing seems completely synchronous. Additionally, the application is agnostic as to whether the event is sent from SOAP, REST or any other web service as long as the events are encoded appropriately. Further, the application (actor) can register to receive events. At 316, the service creates an appropriate response from the event and returns 318 that to the stack, which then can create an HTTP response that is then sent 320 back to the client. Although FIG. 3 shows the synchronous flow, the asynchronous flow is similar with the main difference that the web services PA does not block processing at 312, and 314 is a callback rather than a method return.

Outbound Web Services Request

Figure 4:
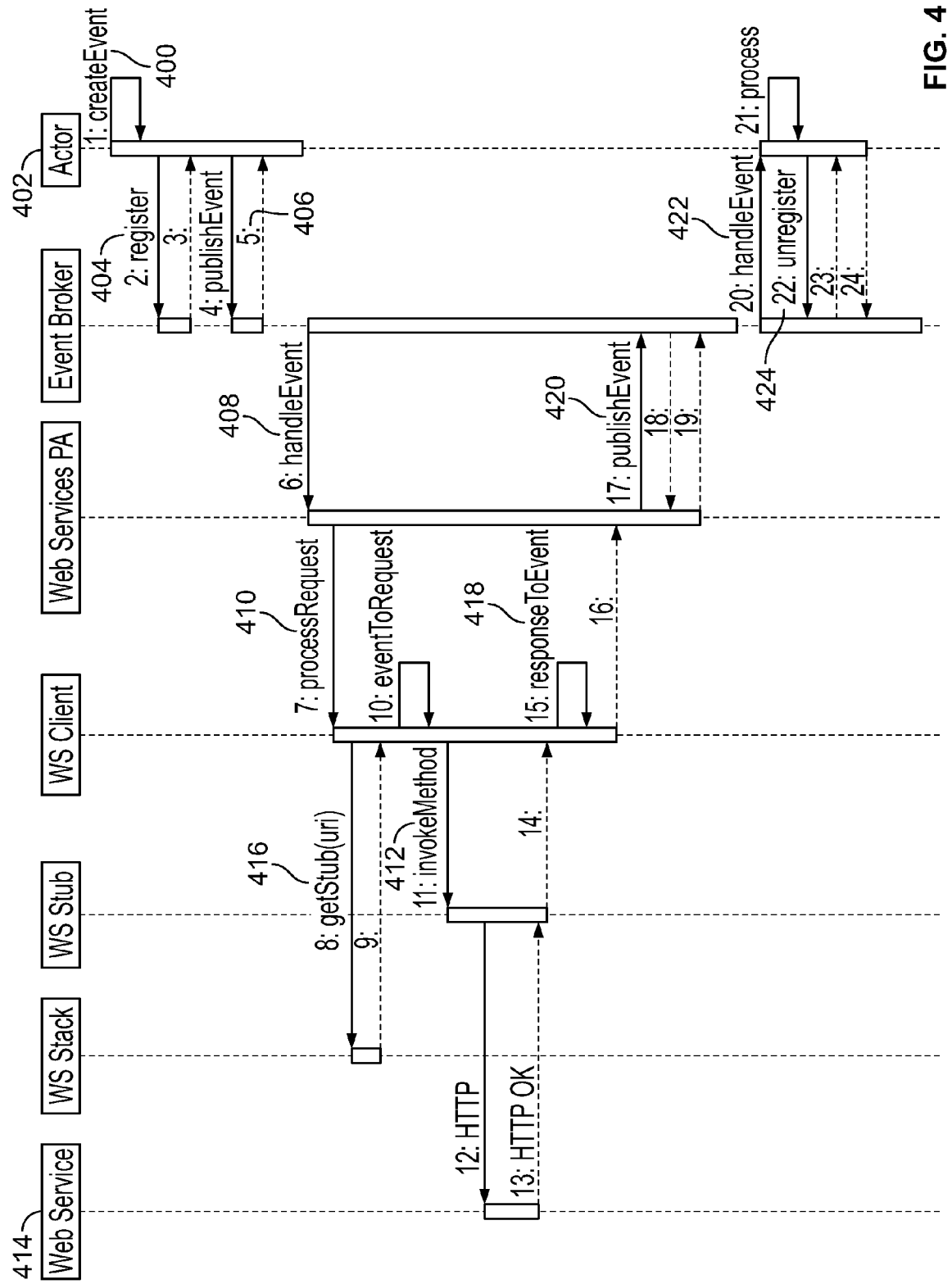
FIG. 4 shows outbound requests that are initiated from an actor, in accordance with an embodiment of the invention.

FIG. 4 shows outbound requests that are initiated from an actor, in accordance with an embodiment of the invention. Similar to the inbound scenario the flow can be synchronous or asynchronous. At 400, an actor 402 sends an outbound web services request. The event can be of type WsOutboundReqEvent and includes details about the request and also specifies if it should be sent using REST, SOAP, or other type of web service. At 404, the actor registers for the response event, which is typically based on a correlation ID included in the event. At 406, the actor publishes the event. At 408, the PA receives the event and finds 410 the correct client implementation (based on service name). At 412, the client code invokes the appropriate web service 414. The actual flow can depend on the particular implementation of the stack being used. The client typically needs a stub 416 of some kind which includes information on how to invoke the web service at the specified URL. At 418, the response is converted to a response event and is dispatched 420 to the event broker. At 422, the actor gets and processes the result. At 424 the actor unregisters its handler with the event broker. Although FIG. 4 shows the synchronous flow, the asynchronous is similar. Differences between the synchronous and asynchronous flow can include that the WS Client returns control after processing the request and the callback can be made in a separate thread.

High Availability

High availability and load balancing are described below separately for inbound and outbound requests.

Outbound requests are sent by the application. These events can be sent from any application and can target any PA instance. Which instance is targeted is transparent to the application and can be chosen via a round robin selection process between each protocol adapter instance. When the request reaches the PA it can send the request to the target destination. Load balancing and failover to the external server can be provided by an external load balancer. Once the response is received the event is sent back to the application. If an application managed server crashes, any request event that is sent will complete and the result will be delivered to the application as it migrates to a new server. If a PA managed server crashes, any requests that were in flight are likely lost and the application can detect a timeout and act appropriately. In an external node crash, any pending requests will likely fail. The PA can detect the error (either as a connection error or timeout) and generate a response event to the application with a suitable status code (e.g. HTTP 500).

Inbound requests are sent by an external web service. The PA can send the event using the Event Broker. When the application responds the response event will target the original PA, since it is sent on the same TCP connection. If an application managed server crashes, normal actor migration and possible replay of the request event can be performed. If a PA managed server crashes, any requests that were in flight will be lost. The application will not be able to detect the error. If an external node crashes, any pending requests sent from the node will be fully processed, but the PA will not be able to send the response.

Error Handling

In accordance with an embodiment of the invention, error handling can be handled by the protocol adapters. This includes any errors communicating with the event broker, as well as time out errors. These errors are translated to corresponding HTTP error codes. Mapping the error codes to appropriate web services responses can be managed by the protocol adapters.

Configuration and Management

The web services protocol adapters use a configuration service for their configuration. The configuration is similar between the protocol adapters, but it is not common between each protocol adapter. Separate sets of configuration files can also be maintained for each web services bundle.

The configuration for the SOAP protocol adapter is split into multiple parts: credential store, generic protocol adapter configuration and SOAP adapter specific configuration. The Credential store is a platform feature and is used for UsernameToken authentication. The generic protocol adapter configuration is what the protocol adapter container uses and the configurable part is the 'outbound' work manager pool. The 'inbound' workmanager can be configured in the HTTP protocol adapter. The SOAP adapter configuration can be split into a client side and a server side. The Client side includes a connectTimeoutMs parameter, which can be used to set a timeout in milliseconds to connect to external HTTP server. The Client side also includes a readTimeoutMs parameter which sets a timeout in milliseconds for requests to an HTTP server. The Server side includes a rootUri parameter which defines the base path that is used for all deployed SOAP web services, and a timeoutMs parameter which sets a timeout in milliseconds for requests to be processed by an application.

Configuration for the REST protocol adapter is split into a generic protocol adapter configuration and a REST adapter specific configuration. In various embodiments, a credential store is available for the web services bundles, and the protocol adapters can be selectively configured to utilize the credential store as needed. The generic protocol adapter configuration can be utilized by the protocol adapter container. The generic protocol adapter configuration can include an 'outbound' work manager pool which can be configured by the protocol adapter container. An 'inbound' workmanager can be configured by the HTTP protocol adapter. The REST adapter specific configuration can be split into a client side and a server side. Similar to the SOAP PA, the client side of the REST PA includes connectTimeoutMs and readTimeoutMs parameters used to set timeouts in milliseconds. The server side includes a rootUri parameter which defines the base path that is used for all deployed REST web services, and a timeoutMs parameter which sets timeout in milliseconds for request to be processed by an application.

In accordance with an embodiment of the invention, every bundle that implements SOAP web services includes a configuration that describes the deployment. The client part describes what external web services this bundle is able to invoke. Each bundle can have zero or more client configurations. The serviceName is the name used to identify the web service. This value is used to route outbound requests to the correct implementation. The implementationClass represents the name of implementing class. The server part describes what web services are supported. Each bundle can have zero or more server configurations. The URI is the address of the web service, for example '/MySoapService'. The full path to the service can also include the rootUri as defined in the server configuration of the SOAP adapter. The implementationClass stores the name of implementing class. The authMethod defines a required authentication method. The username stores the required username for authentication. For example, this is applicable for USERNAME_TOKEN authentication. A credential key is used to validate password during authentication, which is also applicable for USERNAME_TOKEN authentication.

Each bundle that implements REST web services includes configuration that describes the deployment. The client part describes what external web services this bundle is able to invoke. Each bundle can have zero or more client configurations. A serviceName parameter identifies the name used to identify the web service. This value is used to route outbound requests to the correct implementation. An implementationClass parameter identifies the name of implementing class. The application part describes the JAX-RS Applications that are supported. Each bundle can have zero or more application configurations. Also similar to the SOAP configuration, each bundle that implements REST also includes a URI for the web service and an implementationClass which identifies the name of the implementing class.

Although descriptions are provided above for configurations for SOAP and REST bundles, this is not intended to be limiting. Configuration and support can be similarly provided for other types of web services as per user needs.

Security

There are common security features provided by the HTTP protocol adapter and some specific security features that are different for REST and SOAP protocol adapters. In accordance with an embodiment of the invention, one setup for a secure system is to use HTTPS and some form of client authentication. Client authentication can be basic authentication, client certificate authentication or UsernameToken (SOAP only). From a performance point of view basic authentication has the least impact.

HTTP Security

In accordance with an embodiment of the invention, the HTTP protocol adapter can provide a set of server side security features including HTTPS and basic authentication. Note that if HTTPS is configured in the HTTP adapter it will automatically apply to both SOAP and REST since the same connection is shared. Basic authentication can be enabled independently per context path.

For client side security, external web services can define the type of security that is enforced. In this case the protocol adapters do not provide the security and it is left to the web service client implementation to use the stack to provide any security or credentials required by the web services.

SOAP Security

The SOAP protocol adapter provides UsernameToken authentication. This is configured independently of HTTPS and basic authentication and is set per web service endpoint using the 'authMode' configuration parameter. If authMode is set to NONE it means that no additional authentication is made. If authMode is set to USERNAME_TOKEN then each request must contain a valid UsernameToken security header. The username in the header must match the 'username' configuration parameter and the password must match the password that is stored in the credential store using the 'credentialKey' parameter. Note that it is the SOAP Protocol Adapters credential store that should be used to store the password and that the 'one-way' parameter can be set to true. In accordance with an embodiment of the invention, clear text UsernameToken is supported. In accordance with alternative embodiments, a digest version of UsernameToken can be supported.

Web Service Actor Example

Figure 5:
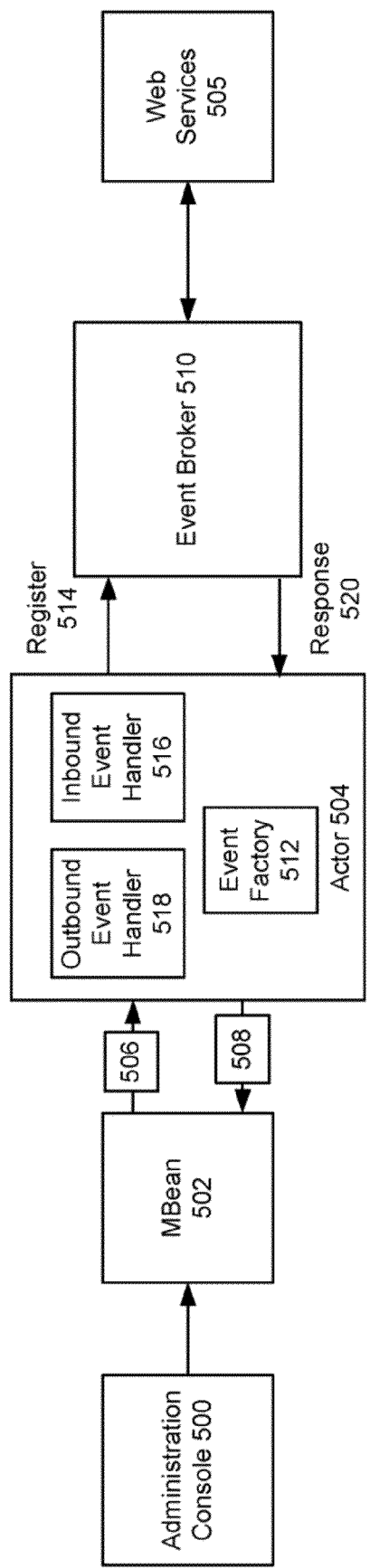
FIG. 5 shows a web service actor example, in accordance with an embodiment of the invention.

FIG. 5 shows a web service actor example, in accordance with an embodiment of the invention. This example is intended to show how an actor can send or receive web services requests using SOAP and REST. Although specific examples are provided with respect to SOAP and REST, other types of web services can also be used.

In accordance with an embodiment of the invention, an administration console 500 can invoke an MBean for runtime management 502 to initiate web service requests. The MBean 502 can communicate with an actor 504 using request 506 and response events 508. The actor 504 is capable of receiving web service requests from one or more web services 505 via an event broker 510 or sending requests that are initiated from the MBean 502. The actor 504 can use APIs for the actor container, event broker and the web services events as discussed above.

The actor can perform protocol binding, by implementing WsProtocolBinding, to get an event factory 512. This event factory allows for web service event creation. The actor can then register 514 with the event broker 510 for inbound events in the resume method. This will allow the actor to consume requests sent from a particular web service. Inbound requests can be handled by an inbound request event handler 516 inner class. The inbound request event handler reviews the operationName in the request and decodes the individual request parameters. This request could be for any web service type, including SOAP and REST, the actor is agnostic. Using the eventFactory the actor can create an appropriate outbound response event.

To send an outbound request, invoke operations in the MBean are called and an event is sent to the actor's outbound request event handler 518. The outbound request event handler 516 can then create an outbound request, and registers with the event handler to receive a response 520 using a request correlator value of the request. The request can specify the type of web service to be used. The event is the published via the event broker. In accordance with an embodiment of the invention, to handle error scenarios, the actor can schedule a timer at this point. When a response is received, it can be handled by the actor's inbound response event handler 514 and sent back to be displayed using the MBean 502.

In a SOAP based implementation, the one or more web services 505 can include a WSDL file, stubs generated from the WSDL file, an XML configuration file, a client implementation and a server implementation. These components are discussed in further detail below.

JAX-WS enables a user to start with a web service from a WSDL or from an annotated Java object. The choice here impacts several things, like the tools that are needed, however WSDL is recommended. Stubs can be generated from the WSDL file using wsimport, which is a tool provided in JAX-WS RI. The XML configuration file describes the supported client and server services.

A synchronous client can be implemented using a java class that implements the interface WsClient. To support asynchronous processing the client can implement WsAsyncClient. WsClient has one method (processRequest) that is invoked every time a request needs to be sent to the network. Using the processRequest method, the client can get the service port, set the endpoint address, decode the arguments and invoke the web service, and create and return a response event. The client can also make sure the proper timeouts are set on the stub. The SOAP PA makes timeout values available as system properties. The constructor for the client can have a signature of "public SampleClient(WsContext context) {" to be able to get a handle to the WsContext. Additionally, in accordance with an embodiment, the JAX-WS Service object can be instantiated when the class is loaded.

The synchronous service can be implemented using a java class that implements the stub that is generated using wsimport. The constructor for the synchronous service can have a signature of "public SampleService(WsContext wsContext) {" to be able to get a handle to the WsContext. Each web service method must encode the arguments in an WsInboundReqEvent, send to the PA, get the result WsOutboundResEvent and decode to return the result.

The asynchronous service can be implemented in a java class. For the asynchronous case there is no interface generated and instead the generic AsyncProvider<Source> API can be implemented. The constructor for the asynchronous service should be structured the same as that for the synchronous service. The AsyncProvider interface only has one method (invoke) where all requests are sent. The source argument that is provided in the invoke method can be decoded using JAXB into the types that wsimport has generated. Then the implementation can decode, create events and asynchronously send the events to the PA.

In a REST based implementation, the one or more web services 505 can include an XML configuration file, a synchronous client implementation and a synchronous server implementation. These components are discussed in further detail below.

The XML configuration file describes the supported client and server services. The synchronous client can be implemented in a java class that implements the interface WsClient. The constructor for this class can have a signature of "public SampleClient(final WsContext context, final Client client) {" to be able to get a handle to the WsContext and the Jersey client object. Using the processRequest of the WsClient interface, the client has the full freedom of the Jersey API to build the request (e.g. using JSON, XML, etc.). The synchronous service is implemented in a java class that is implemented according to JAX-RS. The constructor for this class can have a signature of "public SampleApplication(WsContext wsContext) {" to be able to get a handle to the WsContext. Each web service method can encode the arguments in an WsInboundReqEvent, send the event to the PA, get the result WsOutboundResEvent and decode the response event to return the result.

Figure 6:
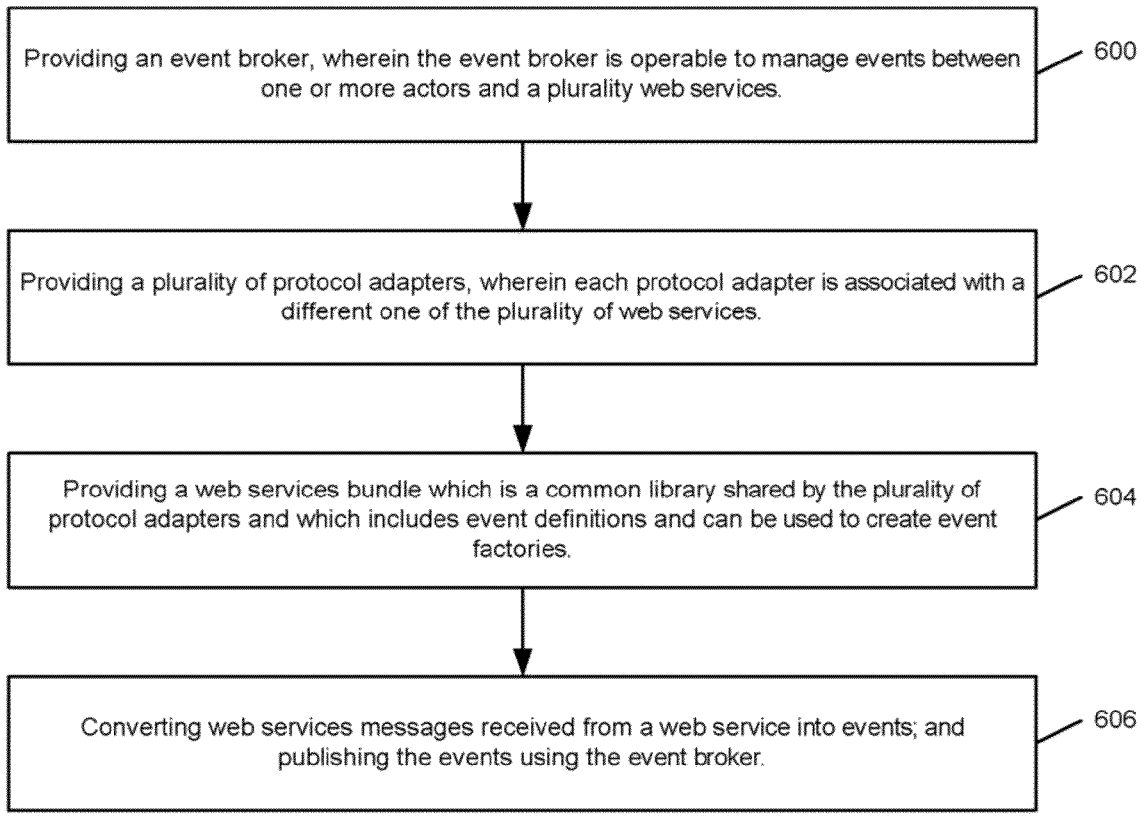
FIG. 6 shows a method of integrating web services into an actor model, in accordance with an embodiment of the invention.

FIG. 6 shows a method of integrating web services into an actor model, in accordance with an embodiment of the invention. At step 600, an event broker is provided, which is operable to manage events between one or more actors and a plurality web services. At step 602, a plurality of protocol adapters are provided, wherein each protocol adapter is associated with a different one of the plurality of web services. At step 604, a common bundle is provided which is a common library shared by the plurality of protocol adapters and which includes event definitions and can be used to create event factories. At step 606, web services messages received from a web service are converted into events. At step 608, the events are published using the event broker.

The method shown in FIG. 6 can further comprise mapping, by a plurality of web services bundles, between generic web services events and the web services messages, describing, in a configuration file included in each web services bundle, which web services it implements, and finding, by each protocol adapter, bundles which include the configuration file and loading the implemented web services.

Additionally, when a protocol adapter starts, the protocol adapter registers to be notified when any web services bundles start. When the protocol adapter is notified that a bundle has started, the protocol adapter checks whether it includes the configuration file and loads web services listed in the configuration file, and the protocol adapter provides to each web service a reference to the protocol adapter, which enables each web service to communicate with protocol adapter.

When a request is received from an external web services client, the request is converted into an inbound request event and sent to an appropriate protocol adapter. The protocol adapter asynchronously publishes the inbound request event to the event broker, waits for a response from an appropriate actor, and returns an outbound response event. The outbound response event is converted into a response and the response is returned to the external web services client.

When an actor sends an outbound web services request event, the actor registers for a response event, using a correlation ID included in the response event. The actor publishes the outbound web services request event, and an appropriate protocol adapter receives the outbound web services request event. The appropriate protocol adapter can then convert the event to a request and invoke an appropriate web service to respond to the request.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system that integrates web services into an actor model, comprising:
   one or more microprocessors;
   an event broker, operating on said one or more microprocessors, wherein the event broker is operable to manage events between one or more actors and a plurality web services; and
   a protocol adapter system, wherein the protocol adapter system is configured to receive inbound messages from the plurality web services via synchronous protocols, publish events asynchronously to the event broker in response to said received messages, consume events asynchronously from the event broker, and transmit messages via synchronous protocols to said plurality of web services in response to said consumed events;
   wherein the protocol adapter system comprises,
      a plurality of protocol adapters,
      a plurality of web service bundles wherein each of said plurality of web service bundles is associated with a different particular web service of the plurality of web services, and wherein each particular web bundle of the plurality of web service bundles provides protocol mapping between generic web service events and web service technology of the particular web service associated with the particular web bundle, and
      a common bundle which is a common library shared by the plurality of protocol adapters, wherein the common bundle includes event definitions for said generic web service events and which event definitions are used to create event factories for said plurality of web services.

2. The system of claim 1,
   wherein each web services bundle includes a configuration file that describes which web services it implements, and wherein each protocol adapter can find web services bundles which include the configuration file and load the implemented web services.

3. The system of claim 2, wherein when a protocol adapter starts:
   the protocol adapter registers to be notified when any web services bundles start,
   when the protocol adapter is notified that a web services bundle has started, the protocol adapter checks whether the web services bundle includes the configuration file and loads web services listed in the configuration file, and
   the protocol adapter provides to each web service a reference to the protocol adapter, which enables each web service to communicate with protocol adapter.

4. The system of claim 1, wherein when a request is received from an external web services client:
   the request is converted into an inbound request event and sent to a protocol adapter associated with the type of web service making the request;
   the protocol adapter asynchronously publishes the inbound request event to the event broker, waits for a response from an appropriate actor, and returns an outbound response event; and
   the outbound response event is converted into a response and the response is returned to the external web services client.

5. The system of claim 1, wherein when an actor sends an outbound web services request event:
   the actor registers for a response event, using a correlation ID included in the response event;
   the actor publishes the outbound web services request event; and
   an appropriate protocol adapter receives the outbound web services request event, converts the event to a request, and invokes an appropriate web service to respond to the request.

6. The system of claim 1, further comprising:
   a protocol adapter container which can manage a lifecycle of each of the protocol adapters.

7. The system of claim 1, wherein the plurality of web services can include SOAP and REST.

8. A method of integrating web services into an actor model, comprising:
   providing an event broker, wherein the event broker is operable to manage events between one or more actors and a plurality web services;
   providing a protocol adapter system wherein the protocol adapter system comprises,
      a plurality of protocol adapters,
      a plurality of web service bundles wherein each of said plurality of web service bundles is associated with a different particular web service of the plurality of web services, and wherein each particular web bundle of the plurality of web service bundles provides protocol mapping between generic web service events and web service technology of the particular web service associated with the particular web bundle, and
      a common bundle which is a common library shared by the plurality of protocol adapters, wherein the common bundle includes event definitions for said generic web service events and which event definitions are used to create event factories for said plurality of web services;
   receiving, with the protocol adapter system, inbound messages from the plurality web services via synchronous protocols;
   publishing events asynchronously from the protocol adapter system to the event broker in response to said received messages;
   consuming events asynchronously from the event broker with the protocol adapter system; and
   transmitting messages via synchronous protocols from the protocol adapter system to said plurality of web services in response to said consumed events.

9. The method of claim 8, further comprising:
   describing, in a configuration file included in each web services bundle, which web services it implements; and
   finding, by each protocol adapter, bundles which include the configuration file and loading the implemented web services.

10. The method of claim 9, wherein when a protocol adapter starts:

registering, by the protocol adapter, to be notified when any web services bundles start;

when the protocol adapter is notified that a web services bundle has started, checking, by the protocol adapter, whether the web services bundle includes the configuration file and loads web services listed in the configuration file, and providing, by the protocol adapter, to each web service a reference to the protocol adapter, which enables each web service to communicate with protocol adapter.

11. The method of claim 8, wherein when a request is received from an external web services client:

converting the request into an inbound request event and sent to an appropriate protocol adapter;

asynchronously publishing, by the protocol adapter, the inbound request event to the event broker, waiting for a response from an appropriate actor, and returning an outbound response event;

converting the outbound response event into a response and the response is returned to the external web services client.

12. The method of claim 8, wherein when an actor sends an outbound web services request event:

registering, by the actor, for a response event, using a correlation ID included in the response event;

publishing, by the actor, the outbound web services request event; and receiving, by an appropriate protocol adapter, the outbound web services request event, converts the event to a request and invokes an appropriate web service to respond to the request.

13. The method of claim 8, further comprising:

managing a lifecycle of each of the protocol adapters by a protocol adapter container.

14. The method of claim 8, wherein the plurality of web services can include SOAP and REST.

15. A non-transitory computer readable storage medium including instructions stored thereon for integrating web services into an actor model, which instructions, when executed by a computer, cause the computer to perform steps comprising:

providing an event broker, wherein the event broker is operable to manage events between one or more actors and a plurality web services;

providing a protocol adapter system wherein the protocol adapter system comprises, a plurality of protocol adapters, a plurality of web service bundles wherein each of said plurality of web service bundles is associated with a different particular web service of the plurality of web services, and wherein each particular web bundle of the plurality of web service bundles provides protocol mapping between generic web service events and web service technology of the particular web service associated with the particular web bundle, and a common bundle which is a common library shared by the plurality of protocol adapters, wherein the common bundle includes event definitions for said generic web service events and which event definitions are used to create event factories for said plurality of web services;

receiving, with the protocol adapter system, inbound messages from the plurality web services via synchronous protocols;

publishing events asynchronously from the protocol adapter system to the event broker in response to said received messages;

consuming events asynchronously from the event broker with the protocol adapter system; and transmitting messages via synchronous protocols from the protocol adapter system to said plurality of web services in response to said consumed events.

16. The non-transitory computer readable storage medium of claim 15, further comprising:

describing, in a configuration file included in each web services bundle, which web services it implements; and finding, by each protocol adapter, bundles which include the configuration file and loading the implemented web services.

17. The non-transitory computer readable storage medium of claim 16, wherein when a protocol adapter starts:

registering, by the protocol adapter, to be notified when any web services bundles start;

when the protocol adapter is notified that a web services bundle has started, checking, by the protocol adapter, whether the web services bundle includes the configuration file and loads web services listed in the configuration file, and providing, by the protocol adapter, to each web service a reference to the protocol adapter, which enables each web service to communicate with protocol adapter.

18. The non-transitory computer readable storage medium of claim 15, wherein when a request is received from an external web services client:

converting the request into an inbound request event and sent to an appropriate protocol adapter;

asynchronously publishing, by the protocol adapter, the inbound request event to the event broker, waiting for a response from an appropriate actor, and returning an outbound response event;

converting the outbound response event into a response and the response is returned to the external web services client.

19. The non-transitory computer readable storage medium of claim 15, wherein when an actor sends an outbound web services request event:

registering, by the actor, for a response event, using a correlation ID included in the response event;

publishing, by the actor, the outbound web services request event; and receiving, by an appropriate protocol adapter, the outbound web services request event, converts the event to a request and invokes an appropriate web service to respond to the request.

20. The non-transitory computer readable storage medium of claim 15, further comprising:

managing a lifecycle of each of the protocol adapters by a protocol adapter container.

* * * * *